May 25, 1965     H. PERROT ETAL     3,185,504
COUPLING ARRANGEMENT

Filed July 9, 1962     4 Sheets-Sheet 1

INVENTORS
Heinrich Perrot &
Emil Schucker
BY George H. Spencer
ATTORNEY

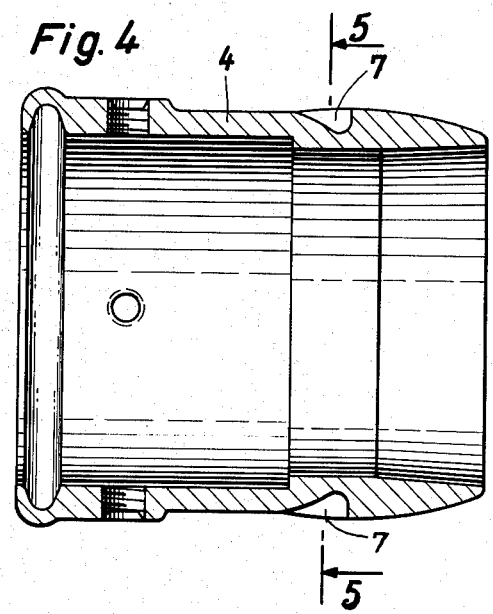
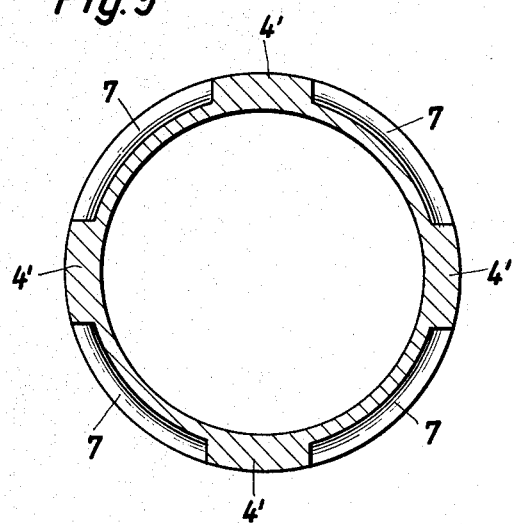

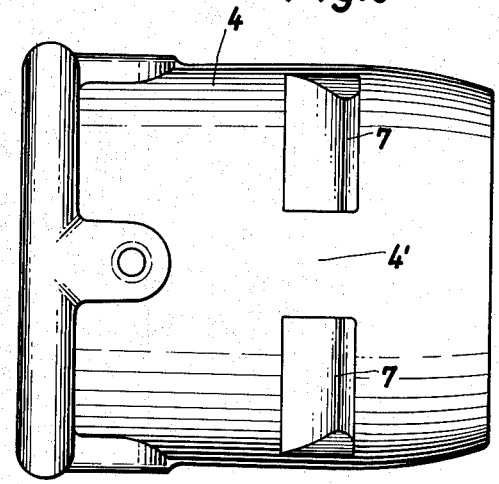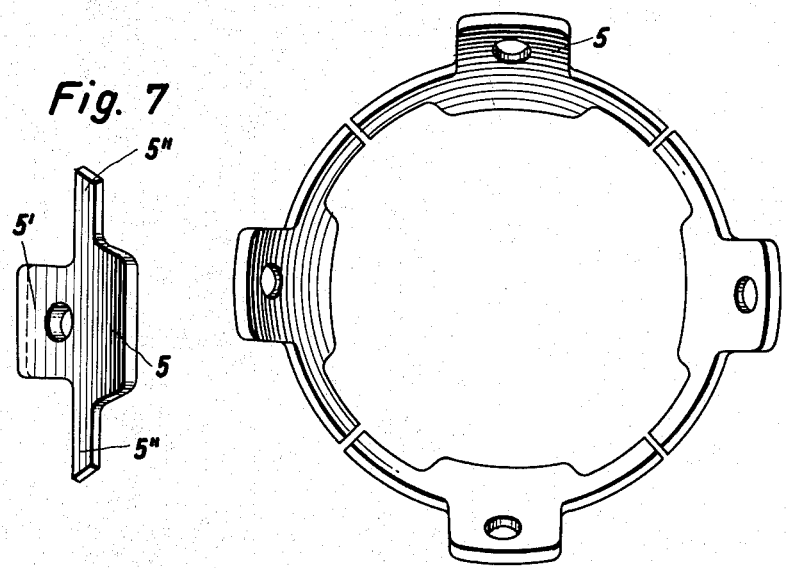

United States Patent Office 3,185,504
Patented May 25, 1965

3,185,504
COUPLING ARRANGEMENT
Heinrich Perrot, Calw-Althengstett, and Emil Schucker, Calw, Germany, assignors to Perrot-Regnerbau G.m.b.H. & Co., Calw, Wurttemberg, Germany
Filed July 9, 1962, Ser. No. 208,481
Claims priority, application Germany, July 19, 1961, P 27,553
4 Claims. (Cl. 285—105)

The present invention relates to a coupling arrangement, and, more particularly, to a quickly releasable coupling arrangement of the type wherein the locking elements are mounted on a coupling sleeve, cooperate with a sealing ring, and engage recesses of a plug-type coupling member when the latter is introduced into the sleeve.

There exist coupling arrangements in which a spiral spring ring is arranged in an enlarged, forwardly tapering receiving end. If the spring is located in the largest part of the receiving end, the plug or male connector component may be introduced into the sleeve or female component, whereas when the spring is located in the forward tapered region, the spring serves to prevent the withdrawal of the plug component, thereby locking the parts together. The spring is brought into its locking position through the action of the sealing ring which itself is shifted axially as a result of the pressure prevailing within the tubing. Such an arrangement is shown in U.S. Patent No. 2,638,362. Experience has shown, however, that a coupling of this type, which is responsive to axially applied forces, is not able to withstand very great pressures. Moreover, the parts are not actually locked together, unless the pressure within the tubing is greater than that prevailing exteriorly of the tubing. This is a decided disadvantage if, for instance, a section of tubing containing the coupling is to be physically moved in the direction of its length at a time when there is no fluid medium being conveyed through the tubing, or when such a section is, for any one of a number of reasons, to be transported as a single unit.

There also exist coupling arrangements of the type shown, for example, in U.S. Patent No. 2,465,197 and in German Patent No. 938,815, which do not allow the axes of the tubes being coupled together to be even slightly out of alignment, and which incorporate locking means that have to be manipulated in a special manner.

It has also been proposed to provide rigid coupling arrangements wherein the external sleeve component has exteriorly arranged locking elements which engage recesses in the sleeve serving as seating surfaces, which recesses do not form an annular groove. It has not, however, been possible up to now to construct a suitable quickly releasable coupling which allows some play between the two parts being coupled together, which provides a reliable seal, and which is otherwise advantageous insofar as ease of manufacture is concerned.

It is therefore, an object of the present invention to provide a coupling arrangement which overcomes the above-described drawbacks, and, with this object in view, the present invention resides basically in a coupling arrangement which comprises an outer sleeve, a sealing ring arranged interiorly of the sleeve, a plurality of locking elements which are pivotally mounted on the sleeve, which extend into the interior thereof, and which abut against the sealing ring, and a plug insertable into the sleeve, which plug has an annular groove that is divided into sectors to allow each locking element, upon insertion of the plug into the sleeve, to be received in a respective one of the groove sectors, the latter being flattened at one side. In practice, the number and peripheral positions of the sectors correspond to the number and peripheral positions of the locking elements.

Additional objects and advantages of the present invention will become apparent upon consideration of the following description when taken in conjunction with the accompanying drawings in which:

FIGURE 4 is a longitudinal section of a plug incorporated in the coupling arrangement according to the present invention.

FIGURE 5 is a sectional view taken on line 5—5 of FIGURE 4.

FIGURE 6 is a side elevational view of the plug of FIGURES 4 and 5.

FIGURE 7 shows one of the locking elements incorporated in the coupling arrangement according to the present invention.

FIGURE 8 shows four locking elements, each according to FIGURE 7, arranged to form a circular seat for the sealing ring.

Figure 1:
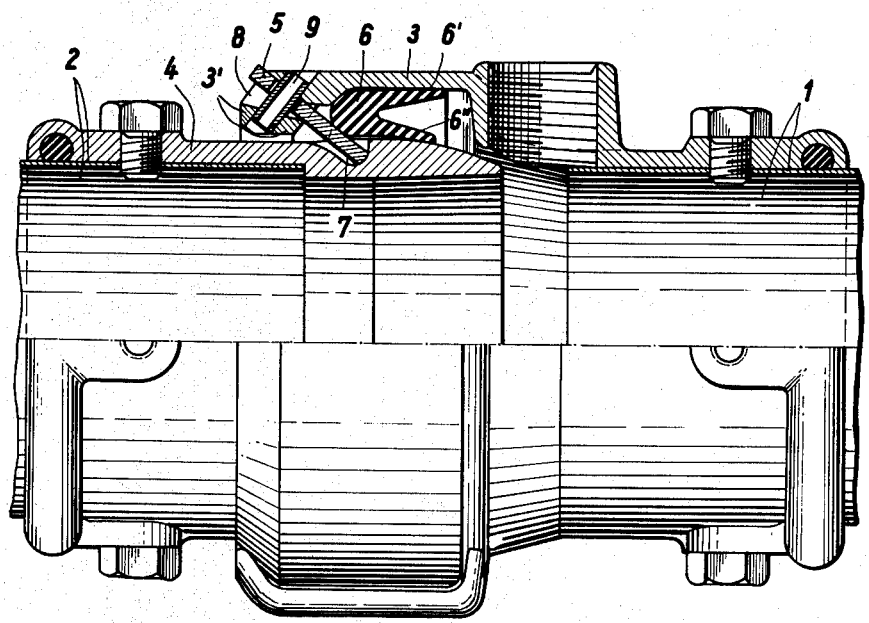
FIGURE 1 is a longitudinal section of a coupling arrangement according to the present invention.
Figure 2:
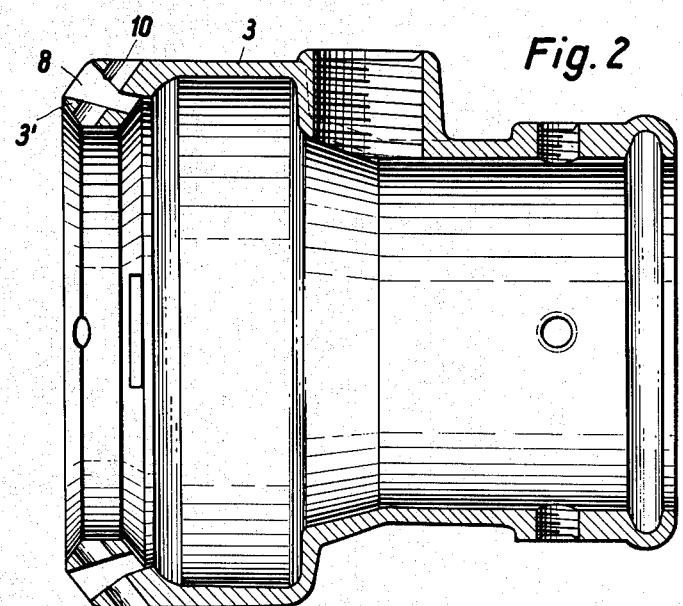
FIGURE 2 is a longitudinal section of a sleeve incorporated in the coupling arrangement according to the present invention.
Figure 3:
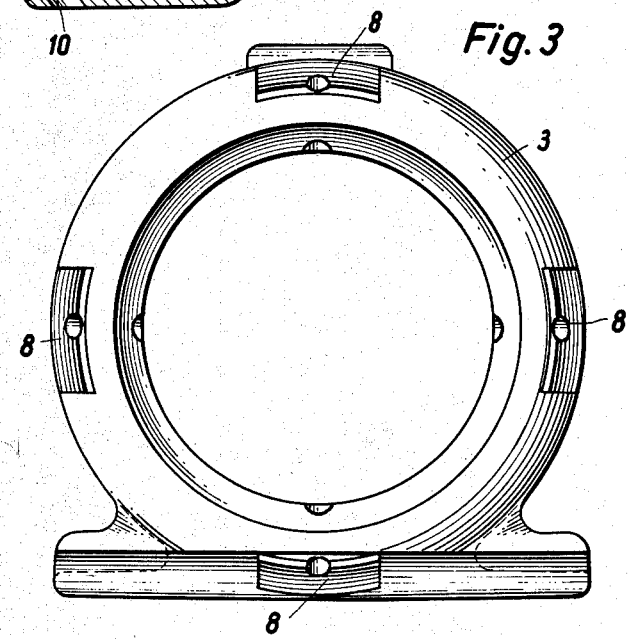
FIGURE 3 is a front view of the sleeve shown in FIGURE 2.

Referring now to the drawings, FIGURE 1 shows two tubes 1 and 2 connected to each other by means of the coupling arrangement according to the present invention, the terms "tubes," "tubing," "conduit" and "pipes" being used interchangeably. The tube or conduit 1 is connected to an outer sleeve or so-called female socket member 3, shown separately in FIGURES 2 and 3, whose spherical end portion 3' is provided with four circumferentially spaced-apart, preferably by 90°, openings 8. Each opening 8 has loosely arranged within it a blade-like arcuate locking element 5 which is secured to the sleeve 3 in any suitable manner, as, for example, by means of a tubular pin 9. Each of the locking elements 5 by itself is rigid, and is oriented at an angle to the axis of the tubing. This is illustrated in FIGURE 1, in which the tubular pin 9 is shown as being fixedly secured to the sleeve 3, the opening of the element 5 through which the pin penetrates, however, being larger than the pin and the opening 8 flaring outwardly. As a result, each element 5 is pivotable or tiltable, within limits, in its respective opening 8 about the edge 10, indicated in FIGURE 2.

Figure 1A:
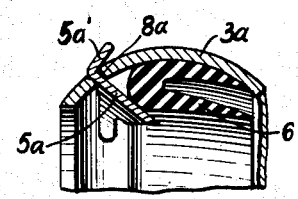
FIGURE 1a is a fragmentary longitudinal section of a modified embodiment of a coupling arrangement according to the present invention.

The mounting of the locking elements 5 may be different from that shown in FIGURE 1. For instance, FIGURE 1a shows that each opening 8a in sleeve 3a can be made relatively small and that each locking element 5a may be provided with a tab portion 5a' which projects through the opening and is bent or crimped over so as to hold the entire locking element 5a in place. The element 5a will, of course, fit sufficiently loosely to afford the same tilting movement as in the case of the mounting illustrated in FIGURE 1.

Each locking element 5 has, as shown in FIGURE 7, an outer tab portion 5' and, at that part which is located interiorly of the sleeve 3, two laterally extending portions 5''. As shown in FIGURE 8, the portions 5'' of all of the locking elements 5 together form a ring which serves as a circular seat for a sealing ring 6 (FIGURE 1). The interior end of the element 5 is tapered toward the interior of the sleeve 3. This ring 6 is fitted into the sleeve 3 and has a V-shaped cross section ending in two sealing flaps 6' and 6''. The outer flap 6' is in engagement with the inner surface of the sleeve 3, while the inner flap 6'' is in engagement with the outer surface of a tubular plug or so-called male member 4, the latter being connected to the tube 2. It will be seen that the greater the pressure prevailing interiorly of the tubing, the greater will be the force with which the flaps 6' and 6" will be pressed against the surfaces of the sleeve 3 and plug 4, respectively.

The plug 4, shown separately in FIGURES 4, 5, and 6, is provided with four arcuate sectors 7, arranged along a common annulus about the plug 4, the centers of the sectors likewise being displaced 90° from each other. These sectors have bottom surfaces which are flattened toward the tube 2. As best shown in FIGURES 5 and 6, the arcuate groove sectors 7 are separated by bridge sectors 4' which are constituted by substantially flush surface portions of the plug 4. The alternating groove sectors 7 and bridge sectors 4' together thus form a complete annulus about the plug 4.

It will be understood that the number of sectors 7, and their angular positions about the circumference of the plug 4, will correspond to the number of locking elements 5 and their angular positions about the circumference of sleeve 3, so that there may be, say, three locking elements and three sectors 7, spaced 120° apart, or five locking elements and five sectors, spaced 72° apart.

The shape and dimensions of the sleeve 3 and the plug 4 are so selected that when the latter is inserted into the former, the parts can move relative to each other, in the direction of the axis of the tubing, a distance that is at least equal to the width (as seen in axial direction) of the groove sectors 7. Consequently, the front end of the plug 4 will have a certain radial play. Furthermore, the outer diameter of the plug 4 is smaller than the inner diameter of the edge of end portion 3'. Thus, the play between the parts, in conjunction with the movability of the locking elements 5 and the elasticity and movability of the sealing ring 6, impart a certain flexibility to the coupling, i.e., the axes of the tubes 1 and 2 can be moved out of a position in which their axes are in strict alignment with each other.

In practice, the parts 3 and 4 can be shaped by cold forming sheet steel, in which case the mounting for the locking elements shown in FIGURE 1a is especially suitable. Alternatively, the parts can be made by any other suitable process.

The two parts can be coupled and uncoupled as follows:

When no plug 4 is located within the sleeve 3, the locking elements 5 will occupy the position shown in FIGURE 1. When the plug 4 is then inserted into the sleeve 3, the locking elements will pivot about the edge 10 (FIGURE 2) of the opening 8. The inner ends of the locking elements are thus forced outwardly in radial direction, thereby slightly deforming the resilient sealing ring 6, until the groove sectors 7 come into alignment with the locking elements 5, whereupon the resiliency of the sealing ring 6 will cause the locking elements 5 to pivot in opposite direction, i.e., the inner ends of the locking element will move radially inwardly, until the locking elements are received within the respective groove sectors 7. This forms a reliable seal between the sleeve 3 and the plug 4, irrespective of the pressure within the tubing; furthermore, the parts 3 and 4 will be effectively locked together even if there is no fluid pressure acting on the sealing ring 6.

In order to release the coupling, the plug 4 is moved axially partway out of the sleeve 3, thereby pressing the locking elements 5 outwardly and out of the groove sectors 7. The plug 4 is then rotated relative to the sleeve 3 about the axis of the tubing until the locking elements 5 come into axial alignment with the bridge sectors 4' which separate the groove sectors 7. The plug 4 can then be easily withdrawn from the sleeve 3 inasmuch as the locking elements will readily slide over the bridge sectors 4', the latter thus serving as cam surfaces.

It will be appreciated that the above described arrangement allows the tubes 1 and 2 to be easily coupled to each other without it being necessary that their axes are in precise alignment with each other. This is so because the coupling inherently allows some play in the alignment of the two tubes, so that it is not essential that the coupling parts 3 and 4 themselves be held and meticulously inserted one into the other; instead, the connection may be established even though the tubes 1 and 2 are held at a considerable distance from their ends.

It will thus be seen that, in accordance with the present invention as described above, there is provided a coupling between two conduits 1, 2, which coupling comprises the female socket member 3 and the male member 4, these members being connectible to the two conduits 1 and 2, respectively. The sealing ring 6 is arranged interiorly of the socket member 3 adjacent one end thereof. Also, there are at least two independent locking elements, represented at 5 in FIGURE 1 and at 5a in FIGURE 1a, which are mounted in the socket member 3 and which are distributed equal angular distances about the inner periphery of the socket member 3. Means are provided for mounting each of the locking elements to the socket member 3 for limited pivotal movement with respect thereto, the arrangement being such that each locking element has a substantially radially inwardly extending portion engaged by the sealing ring. The male member 4 has, adjacent one end thereof, the annular groove which lies in a plane forming a right angle with the axis of the coupling, this groove being divided into sectors 7 separated from each other by the bridge portions 4' (FIGURE 5). There is, for each locking element, a complementarily disposed groove sector into which sector each respecitve locking element is, when the coupling is in its coupled condition, pressed initially by the inherent resiliency of the sealing ring, it being appreciated that any fluid pressure prevailing interiorly of the coupled together conduits will reinforce the sealing action.

It will also be seen that since, as described above, the outer diameter of the male member 4 is smaller than the inside diameter of the outermost end of the socket member 3, there is formed the annular gap between the socket member 3 and male member 4 to permit axial misalignment therebetween and to impart flexibility to the coupling.

It will be understood that the above description of the present invention is susceptible to various modifications, changes, and adaptations, and the same are intended to be comprehended within the meaning and range of equivalents of the appended claims.

What is claimed is:

1. A coupling between two conduits comprising, in combination:

(a) a female socket member connectible to one of the two conduits;

(b) a sealing ring arranged interiorly of said socket member adjacent one end thereof;

(c) at least two independent locking elements mounted in said socket member and distributed equal angular distances about the inner periphery of said socket member and means mounting each of said locking elements to said socket member for limited pivotal movement with respect thereto, each locking element having a substantially radially inwardly extending portion engaged by said sealing ring; and (d) a male member connectible to the other of the two conduits and insertable into said socket member, said male member having, adjacent one end thereof, an annular groove which lies in a plane forming a right angle with the axis of the coupling, said groove being divided into sectors separated from each other by bridge portions, there being for each locking element a complementarily disposed groove sector into which sector each respective locking element is, when said coupling is in coupled condition, pressed initially by the inherent resiliency of said sealing ring;

(e) the outer diameter of said male member being smaller than the inside diameter of the outermost end of said socket member thereby to form an annular gap between said socket member and said male member to permit axial misalignment therebetween and to impart flexibility to said coupling.

2. A coupling as defined in claim 1 wherein said means which mount each respective locking element comprise a bent tab portion which is integral with the remainder of the respective locking element and which passes through an opening provided in said socket member near said end thereof.

3. A coupling as defined in claim 1 wherein said means which mount each respective locking element comprise a respective pin which is secured to said socket member near said end thereof, said pin passing through an opening of the respective locking element, said opening being larger than the respective pin.

4. A coupling as defined in claim 1 wherein each of said locking elements is arcuate and has an inner end which is tapered toward the interior of said socket member.

References Cited by the Examiner

UNITED STATES PATENTS

| | | | |
|---|---|---|---|
| 1,056,197 | 3/13 | McKee | 285—320 X |
| 1,098,752 | 6/14 | Olsen | 285—84 |
| 1,301,565 | 4/19 | Jacobs | 285—319 |
| 2,465,197 | 3/49 | Chatham | 285—105 |
| 2,476,172 | 7/49 | Williams | 285—307 |
| 2,700,559 | 1/55 | Jensen | 285—317 X |
| 2,869,099 | 1/59 | Robinson. | |

FOREIGN PATENTS

| | | |
|---|---|---|
| 938,815 | 2/56 | Germany. |
| 1,084,987 | 7/60 | Germany. |
| 1,089,599 | 9/60 | Germany. |
| 625,022 | 6/49 | Great Britain. |

CARL W. TOMLIN, *Primary Examiner.*